(12) United States Patent
Suzuki et al.

(10) Patent No.: US 12,475,793 B2
(45) Date of Patent: Nov. 18, 2025

(54) INFORMATION PROCESSING DEVICE, INFORMATION PROCESSING METHOD, AND RECORDING MEDIUM

(71) Applicant: Panasonic Intellectual Property Management Co., Ltd., Osaka (JP)

(72) Inventors: Takayuki Suzuki, Kanagawa Ken (JP); Akitoshi Yamashita, Hyogo Ken (JP); Yuji Matsumoto, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 69 days.

(21) Appl. No.: 18/425,955

(22) Filed: Jan. 29, 2024

(65) Prior Publication Data

US 2024/0304090 A1    Sep. 12, 2024

(30) Foreign Application Priority Data

Mar. 8, 2023  (JP) .................. 2023-035250

(51) Int. Cl.
| | |
|---|---|
| *G08G 1/16* | (2006.01) |
| *G06V 20/58* | (2022.01) |
| *B60R 1/25* | (2022.01) |
| *B60R 1/26* | (2022.01) |
| *G02B 5/08* | (2006.01) |

(52) U.S. Cl.
CPC ............. *G08G 1/167* (2013.01); *G06V 20/58* (2022.01); *G08G 1/16* (2013.01); *B60R 1/25* (2022.01); *B60R 1/26* (2022.01); *B60R 2300/802* (2013.01); *B60R 2300/8093* (2013.01); *G02B 5/08* (2013.01)

(58) Field of Classification Search
CPC .......... G08G 1/16; G08G 1/166; G08G 1/167; G01S 13/00; G01S 13/04; G01S 13/93; G01S 7/41; G01S 7/415; G02B 5/00; G02B 5/08; G02B 5/26
See application file for complete search history.

(56) References Cited

U.S. PATENT DOCUMENTS

| | | | |
|---|---|---|---|
| 2012/0314074 A1 | 12/2012 | Aimura et al. | |
| 2016/0252610 A1* | 9/2016 | Smith | G01S 7/411 342/27 |
| 2022/0068135 A1* | 3/2022 | Kang | G01S 7/41 |

FOREIGN PATENT DOCUMENTS

| | | |
|---|---|---|
| JP | 2008-186170 | 8/2008 |
| JP | 2009-166624 | 7/2009 |
| WO | 2011/108218 | 9/2011 |

* cited by examiner

*Primary Examiner* — Van T Trieu

(74) *Attorney, Agent, or Firm* — Greenblum & Bernstein, P.L.C.

(57) ABSTRACT

An information processing device includes a determination unit and a first output control unit. The determination unit determines whether a target object is present in a blind spot region between observation regions around a mobility. The first output control unit outputs first warning information indicative of presence of the target object in the blind spot region in a case where the target object has been determined to be present in the blind spot region.

14 Claims, 9 Drawing Sheets

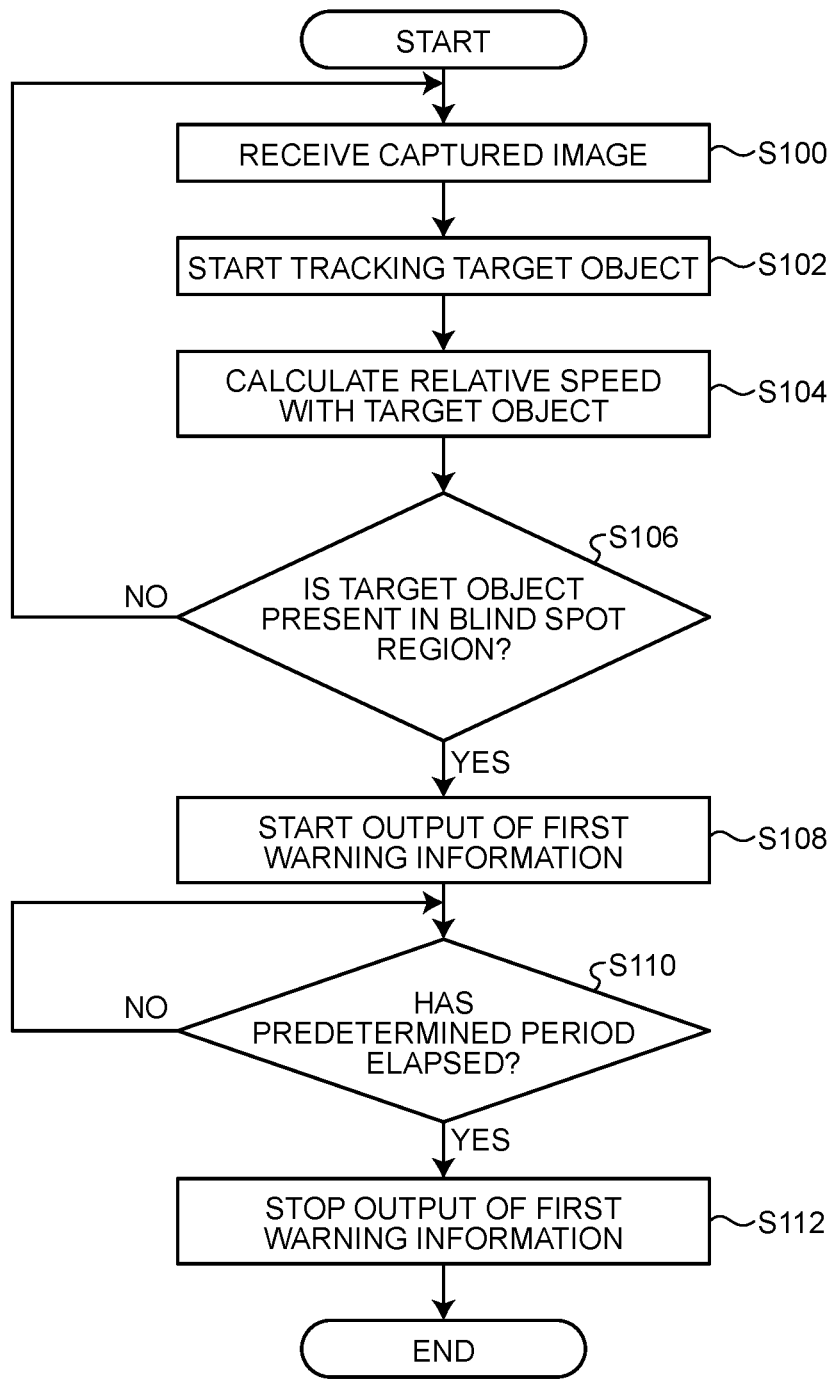

INFORMATION PROCESSING DEVICE, INFORMATION PROCESSING METHOD, AND RECORDING MEDIUM

CROSS-REFERENCE TO RELATED APPLICATIONS

This application is based upon and claims the benefit of priority from Japanese Patent Application No. 2023-035250, filed on Mar. 8, 2023, the entire contents of which are incorporated herein by reference.

FIELD

The present disclosure relates to an information processing device, an information processing method, and a recording medium.

BACKGROUND

A system for detecting an object present around a vehicle by a sensor installed in the vehicle has been known (for example, WO 2011-108218 A and JP 2008-186170 A).

In the known system, for example, in a case where a target object located within an observation range of the sensor is an animal, an alarm is continuously output even after the animal has left the observation range.

In addition, for example, there is a known system for determining a risk level on the basis of an estimation result of a moving state of a mobility that has gone outside an observation range of a sensor.

However, the known technology has no sufficient consideration of determining and warning of a target object present in a blind spot region between observation regions.

SUMMARY

An information processing device according to the present disclosure includes a memory in which a computer program is stored and a hardware processor coupled to the memory. The hardware processor is configured to perform processing by executing the computer program. The processing includes determining whether a target object is present in a blind spot region between observation regions around a mobility, and outputting first warning information indicative of presence of the target object in the blind spot region in a case where the target object has been determined to be present in the blind spot region.

BRIEF DESCRIPTION OF THE DRAWINGS

FIG. 9 is a flowchart illustrating an example of a procedure of information processing executed by the information processing device according to the embodiment.

DETAILED DESCRIPTION

Hereinafter, embodiments of an information processing device, an information processing method, and a recording medium according to the present disclosure will be described with reference to the accompanying drawings.

Figure 1:
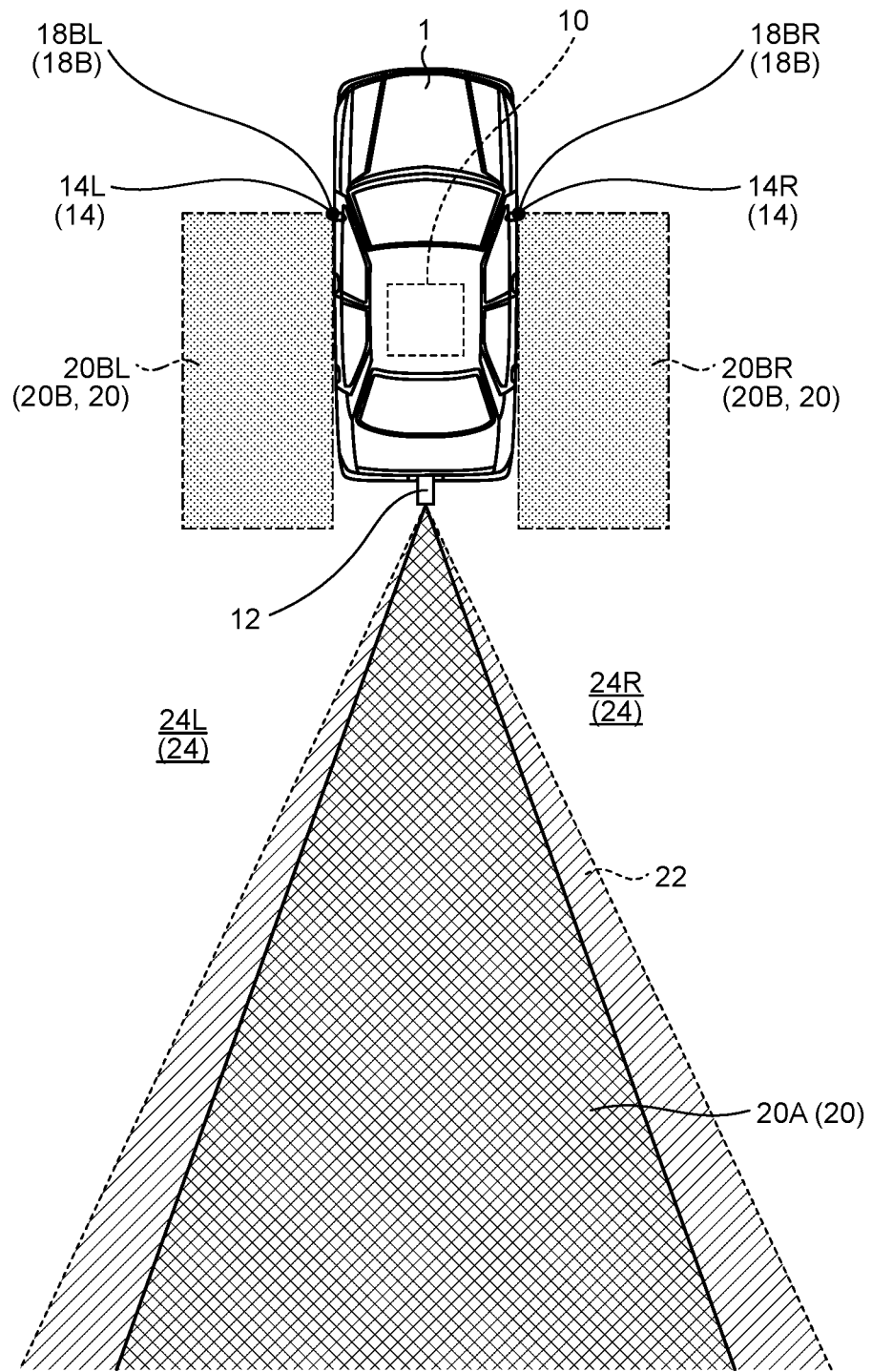
FIG. 1 is a schematic diagram illustrating an example of an information processing device according to an embodiment.

FIG. 1 is a schematic diagram illustrating an example of an information processing device 10 according to the present embodiment.

The information processing device 10 is a device for warning an occupant of a mobility of the presence of a target object around the mobility.

The mobility is a movable object. The present embodiment will describe an example of a mode in which the mobility is a vehicle 1. The present embodiment will describe an exemplary mode in which the information processing device 10 is installed on the vehicle 1.

The target object is an object present around the vehicle 1. Examples of the target object include another vehicle traveling around the vehicle 1, an animal, and a pedestrian.

Observation regions 20 are provided around the vehicle 1. The observation region 20 refers to a region around the vehicle 1 and is observed by various sensors provided in the vehicle 1. Among the observation regions 20, some of them are required not to overlap with each another, whereas the other ones may partially overlap with each other. In the present embodiment, the observation region 20 is classified into a first observation region 20A and a second observation region 20B. The first observation region 20A and the second observation region 20B are observation regions 20 observed by different types of sensors.

In the present embodiment, the vehicle 1 includes an imaging device 12 and a radar 14 as sensors. The vehicle 1 may further include plural types of sensors.

The imaging device 12 captures an image of an imaging region 22 around the vehicle 1 to obtain captured image data. Hereinafter, the captured image data will be simply referred to as a captured image. The imaging region 22 is a region captured by the imaging device 12. The imaging region 22 is determined by adjusting conditions such as the angle of view of the imaging device 12. The imaging device 12 outputs the received captured image to the information processing device 10. In the present embodiment, the imaging device 12 continuously captures the captured images over time, and sequentially outputs the captured images obtained by the imaging to the information processing device 10.

The present embodiment will describe a mode in which the vehicle 1 is provided with the imaging device 12 having the imaging region 22 on the rear side of the vehicle 1. In the imaging device 12, the imaging angle of view and the installation position are pre-adjusted such that the imaging region 22 covers the rear side in the periphery of the vehicle 1. The imaging device 12 outputs a captured image of the imaging region 22 on the rear side around the vehicle 1 to the information processing device 10. Note that the number and arrangement positions of the imaging devices 12 provided in the vehicle 1 are not limited to the above mode.

In the present embodiment, part of the imaging region 22 corresponds to the first observation region 20A. The first observation region 20A is an example of the observation region 20. The first observation region 20A is a display target region to be displayed on a display device such as an electronic mirror provided in the vehicle 1. The first observation region 20A is part of the imaging region 22.

The radar 14 detects a target object around the vehicle 1 and measures a distance between the target object and the vehicle 1. The radar 14 detects a target object present in the second observation region 20B around the vehicle 1 by performing scanning with a millimeter wave which is an electromagnetic wave, for example.

The second observation region 20B is the observation region 20 observed by the radar 14. The second observation region 20B is the observation region 20 that is at least partially non-overlapping with the first observation region 20A. In the present embodiment, the second observation region 20B includes a second observation region 20BR and a second observation region 20BL. Details of the second observation region 20BR and the second observation region 20BL will be described later. In place of the radar 14, a light detection and ranging (LiDAR) sensor or sonar may be used for detecting a target object around the vehicle 1 and measure a distance between the target object and the vehicle 1.

In the present embodiment, the vehicle 1 is provided with a radar 14R and a radar 14L as the radar 14.

The radar 14R is provided on one end side in a vehicle width direction of the vehicle 1. For example, the radar 14R is provided on a right side mirror 18BR of the vehicle 1. The right side mirror 18BR is a side mirror 18B provided on the right side of the vehicle 1. The radar 14R scans the second observation region 20BR, which is a right side and right rear region around the vehicle 1, to detect a target object located in the second observation region 20BR. The second observation region 20BR is the second observation region 20B observed by the radar 14R. The radar 14R outputs a detection result to the information processing device 10. The detection result obtained by the radar 14R includes the presence or absence of the target object in the second observation region 20BR, the distance to the target object, and the like.

The radar 14L is provided on the other end side in the vehicle width direction of the vehicle 1. For example, the radar 14L is provided on a left side mirror 18BL of the vehicle 1. The left side mirror 18BL is the side mirror 18B provided on the left side of the vehicle 1. The radar 14L scans a second observation region 20BL, which is a left side and left rear region around the vehicle 1, to detect a target object located in the second observation region 20BL. The second observation region 20BL is the second observation region 20B observed by the radar 14L. The radar 14L outputs a detection result to the information processing device 10. The detection result obtained by the radar 14L includes the presence or absence of the target object in the second observation region 20BL, the distance to the target object, and the like.

Therefore, the radar 14 is configured to be able to detect a target object which is traveling or present in another lane adjacent to the lane where the vehicle 1 is traveling. As described above, the observation region 20 by the radar 14 corresponds to the second observation region 20B. Subsequently, the radar 14 outputs the detection result to the information processing device 10.

Next, a functional configuration of the vehicle 1 will be described in detail.

Figure 2:
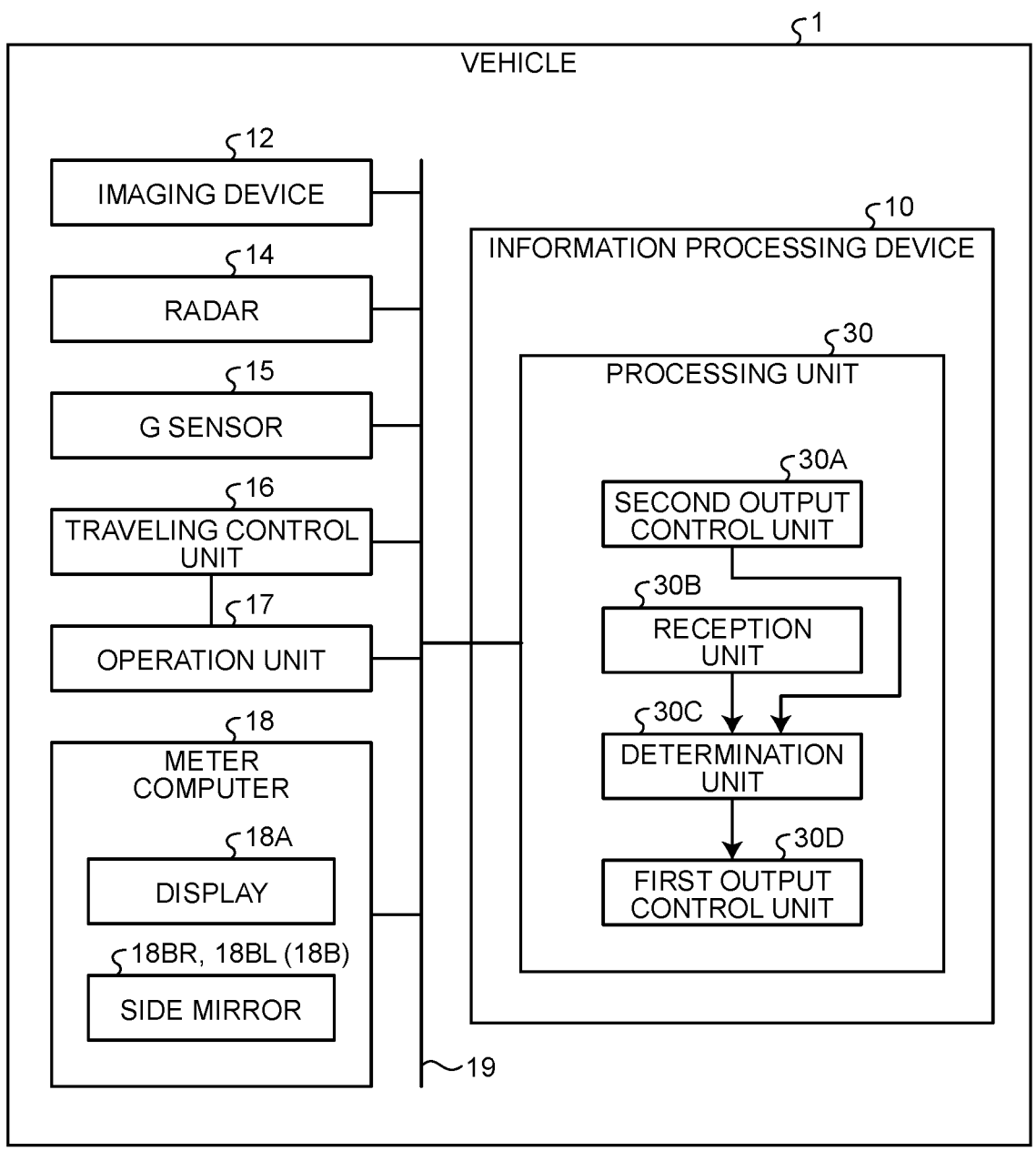
FIG. 2 is a block diagram of an example of a functional configuration of a vehicle.

FIG. 2 is a block diagram of an example of a functional configuration of the vehicle 1.

The vehicle 1 includes an imaging device 12, a radar 14, a G sensor 15, a traveling control unit 16, an operation unit 17, a meter computer 18, and an information processing device 10.

The imaging device 12, the radar 14, the G sensor 15, the traveling control unit 16, the operation unit 17, the meter computer 18, and the information processing device 10 are communicably connected to each other via a bus 19 or the like. The bus 19 may be implemented by using a local area network such as a controller area network (CAN), for example.

The G sensor 15 measures the acceleration of the vehicle 1 and outputs a measurement result to the information processing device 10. The present embodiment will describe an exemplary mode in which the G sensor 15 outputs a measurement result including the acceleration of the vehicle 1 to the information processing device 10.

The traveling control unit 16 is an engine control unit (ECU) that controls travel of the vehicle 1. Based on operation information by an occupant, received from the operation unit 17, the traveling control unit 16 executes control of drive devices such as an engine or a motor of the vehicle 1 and control of transmission system devices such as transmissions of the vehicle 1.

The operation unit 17 is operated by a driver, which is an example of an occupant. The operation unit 17 includes, for example, an ignition switch, a shift lever, a direction indicator, an accelerator pedal, and a brake pedal. The direction indicator is an indicator for notifying the surroundings of a change in the moving direction of the vehicle 1. Note that the operation unit 17 installed on the vehicle 1 is not limited thereto.

The traveling control unit 16 controls the drive device and the transmission system device of the vehicle 1 based on operation information regarding an ignition switch, shift position information regarding a shift lever, operation information regarding a direction indicator, accelerator pedal operation information regarding an accelerator pedal, brake pedal information regarding a brake pedal, and the like. In the present embodiment, the traveling control unit 16 outputs operation information of the direction indicators and the like to the information processing device 10.

The meter computer 18 has an information notification function for an occupant such as a driver. An example of the meter computer 18 is a human machine interface (HMI). Examples of the information notification function include a display function of displaying information, a sound output function of outputting sound representing information, a light output function of outputting light indicating information by allowing the light to turn on or blink. The display function is implemented by a combination meter device that notifies the driver by display, for example. The sound output function is implemented by a notification sound generation device such as a buzzer or a speaker that performs notification by audio, for example.

The present embodiment will describe an exemplary mode in which the meter computer 18 includes at least a display 18A and a side mirror 18B.

The display 18A is a device that displays information. The present embodiment describes an exemplary mode in which the display 18A is an electronic mirror. The electronic mirror is a device that displays a captured image, which is a captured rear view image of the vehicle 1, on a mirror surface. The electronic mirror may be referred to as a smart rear-view mirror (SRVM), an intelligent rear-view mirror, an electronic inner mirror, or the like depending on the manufacturer of the vehicle 1.

The side mirror 18B includes an indicator. The indicator of the side mirror 18B functions as a device that outputs various types of information. The side mirror 18B may be configured as an electronic side mirror that displays a captured side view image of the vehicle 1. In this case, the side mirror 18B functions as a device serves to output information. The present embodiment will describe an exemplary mode in which the indicator of the side mirror 18B functions as a device that outputs various types of information.

Next, the information processing device 10 will be described in detail.

Figure 3:
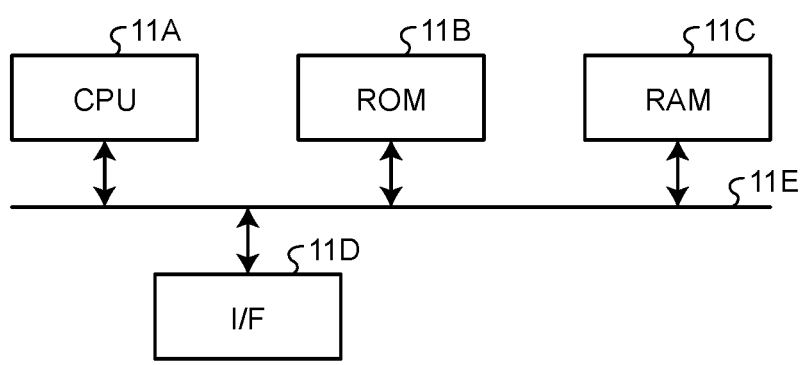
FIG. 3 is a hardware configuration diagram of an example of an information processing device.

FIG. 3 is a hardware configuration diagram of an example of the information processing device 10.

The information processing device 10 has a hardware configuration using a normal computer in which a central processing unit (CPU) 11A, read only memory (ROM) 11B, random access memory (RAM) 11C, an interface (I/F) 11D, and the like are connected to each other by a bus 11E.

The CPU 11A is an arithmetic device that controls the information processing device 10 of the present embodiment. The ROM 11B stores data such as a computer program that implements various processes by the CPU 11A. The RAM 11C stores data necessary for various processes performed by the CPU 11A. The I/F 11D is an interface for transmitting and receiving data.

A computer program for executing information processing executed by the information processing device 10 of the present embodiment is provided as a pre-installed program in the ROM 11B or the like. The program executed by the information processing device 10 of the present embodiments may be provided as a file in a format installable or executable on the information processing device 10, recorded in a computer readable recording medium such as CD-ROM, a flexible disk (FD), a CD-R, or a Digital Versatile Disc (DVD).

Description will be continued with reference to FIG. 2 again.

The information processing device 10 includes a processing unit 30. The processing unit 30 executes various types of information processing. For example, with referring to FIG. 3, the CPU 11A reads a program from the ROM 11B onto the RAM 11C and executes the program, whereby each functional part of the processing unit 30 described below is implemented on the computer.

The processing unit 30 includes a second output control unit 30A, a reception unit 30B, a determination unit 30C, and a first output control unit 30D. Some of or all the second output control unit 30A, the reception unit 30B, the determination unit 30C, and the first output control unit 30D may be implemented by, for example, causing a processing device such as the CPU 11A to execute a program, that is, by software, may be implemented by hardware such as an integrated circuit (IC), or may be implemented by using software and hardware in combination. Moreover, at least one of the second output control unit 30A, the reception unit 30B, the determination unit 30C, or the first output control unit 30D may be installed on an external information processing device communicably connected to the information processing device 10 via a network or the like.

When a target object is present in the second observation region 20B, the second output control unit 30A outputs second warning information indicative of presence of the target object in the second observation region 20B.

The issuing of the second warning information is one of driving support functions provided in the vehicle 1. The second warning information is a warning to be output to, for example, an indicator of the side mirror 18B at the time of detection of a target object on the adjacent lane, which is traveling on the rear side of the vehicle. The issuing of the second warning information by the second output control unit 30A may be referred to as a blind spot warning (BSW) for detecting a vehicle approaching from the rear side.

With the reception of the detection result from the radar 14, the second output control unit 30A receives a detection result of the second observation region 20B. When the detection result received from the radar 14 is indicative of presence of the target object in the second observation region 20B, the second output control unit 30A outputs second warning information.

As described above, in the present embodiment, the second observation region 20B observed by the radar 14 is a right side region and a right rear region around the vehicle 1 (second observation region 20BR) as well as a left side region and a left rear region around the vehicle 1 (second observation region 20BL).

Therefore, when the detection result obtained by the radar 14R is indicative of presence of the target object in the second observation region 20BR, the second output control unit 30A outputs the second warning information to the indicator of the right side mirror 18BR. In addition, when the detection result obtained by the radar 14L is indicative of the presence of the target object in the second observation region 20BL, the second output control unit 30A outputs the second warning information to the indicator of the left side mirror 18BL. For example, the second output control unit 30A controls the indicator of the side mirror 18B to turn on or blink, thereby outputting the second warning information to the indicator.

In the present embodiment, when the detection result received from the radar 14 is indicative of the presence of the target object in the second observation region 20B, the second output control unit 30A outputs the second warning information to the indicator, and outputs second warning information output ongoing information representing that the output of the second warning information is ongoing, to the first output control unit 30D described below.

The reception unit 30B receives a captured image including the first observation region 20A. As described above, the imaging device 12 outputs a captured image of the imaging region 22 on the rear side around the vehicle 1 to the information processing device 10. In addition, the captured image obtained by the imaging device 12 includes the first observation region 20A in the imaging region 22. Therefore, with the reception of the captured image from the imaging device 12, the reception unit 30B receives the captured image including the first observation region 20A.

The determination unit 30C determines whether a target object is present in a blind spot region 24 around the vehicle 1.

This will be described with reference to FIG. 1. The blind spot region 24 is a region between observation regions 20 around the vehicle 1. The present embodiment will describe an exemplary case where the blind spot regions 24 are present around the vehicle 1. In the case of the example illustrated in FIG. 1, the blind spot regions 24 present around the vehicle 1 include blind spot regions 24R and 24L. The blind spot region 24R is present between the second observation region 20BR and the first observation region 20A. The blind spot region 24L is present between the second observation region 20BL and the first observation region 20A.

Description will be continued with reference to FIG. 2 again.

The determination unit 30C makes determination that the target object is present in the blind spot region 24 when at least one of conditions is satisfied. The conditions include: the target object is present continuously for a predetermined period of time or more in at least one observation region 20 among the observation regions 20; the target objects of a predetermined number or more are present in at least one observation region 20; and at least part of the target object imaged in the first observation region 20A being a display target region is located outside the first observation region 20A.

Figure 4:
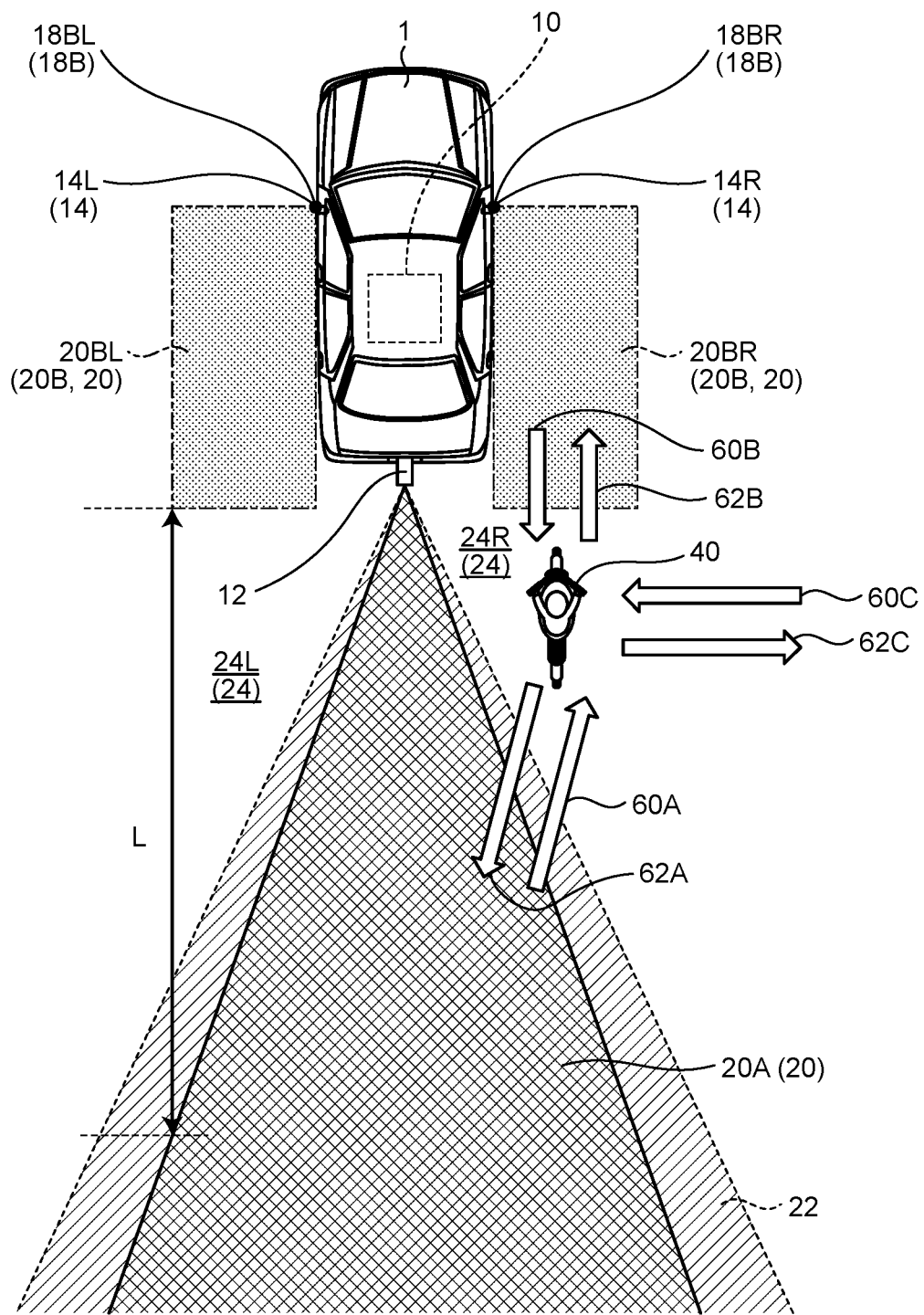
FIG. 4 is an explanatory diagram of an example of determination processing performed by a determination unit.

FIG. 4 is an explanatory diagram of an example of determination processing performed by the determination unit 30C.

First, the following will describe determination processing of determining whether a target object 40 is continuously present in at least one of the observation regions 20 for a predetermined period of time or more.

The determination unit 30C determines whether a target object is continuously present in either the first observation region 20A or the second observation region 20B for a predetermined period of time or more.

For example, the determination unit 30C sequentially receives the detection result for the second observation region 20B (the second observation region 20BL and the second observation region 20BR) from each of the radar 14R and the radar 14L, respectively.

Based on the detection result at each time received from the radar 14R, the determination unit 30C discerns whether the target object 40 is present in the second observation region 20BR of the radar 14R and whether the target object 40 is present continuously for a predetermined period of time or more. Similarly, based on the detection result at each time received from the radar 14L, the determination unit 30C discerns whether the target object 40 is present in the second observation region 20BL of the radar 14L and whether the target object 40 is present continuously for a predetermined period of time or more.

Through the discerning processing, the determination unit 30C may determine whether the target object 40 is continuously present in the second observation region 20B for a predetermined period of time or more. The predetermined period of time may be determined by pre-setting a value by which occurrence of a traffic jam can be discerned. The predetermined number and the predetermined period of time may be appropriately changeable with an operation instruction or the like by the user.

Moreover, for example, the determination unit 30C analyzes the captured image of the imaging region 22 for each reception time sequentially received from the imaging device 12 in time series, thereby discerning whether the number of target objects 40 present in the first observation region 20A, which is a partial region in the captured image of the imaging region 22, is a predetermined number of 1 or more, and the predetermined number of target objects 40 are continuously present for a predetermined period of time or more. With this discerning processing, the determination unit 30C may determine whether the target object 40 is continuously present in the first observation region 20A for a predetermined period of time or more. The predetermined number and the predetermined period of time may be determined by pre-setting values by which occurrence of a traffic jam can be discerned. The predetermined number and the predetermined period of time may be appropriately changeable with an operation instruction or the like by the user.

When having determined that the target object 40 is continuously present in the observation region 20 for a predetermined period of time or more, the determination unit 30C estimates that a traffic jam is occurring and makes determination that the target object 40 is present in the blind spot region 24.

In addition, when having determined that the target object 40 is continuously present in the observation region 20 for a predetermined period of time or more, the determination unit 30C may further make determination that the target object 40 is present in the blind spot region 24 adjacent to the observation region 20 among the blind spot regions 24. For example, when having determined that the target object 40 is continuously present in the second observation region 20BR for a predetermined period of time or more, the determination unit 30C may further make determination that the target object 40 is present in a blind spot region 24R adjacent to the second observation region 20BR among the blind spot regions 24. In addition, for example, when having determined that the target object 40 is continuously present in the second observation region 20BL for a predetermined period of time or more, the determination unit 30C may further make determination that the target object 40 is present in the blind spot region 24L adjacent to the second observation region 20BL among the blind spot regions 24.

Next, the following will describe the determination processing of determining whether the target objects 40 of a predetermined number or more are present in at least one observation region 20.

The determination unit 30C determines whether the target objects 40 of a predetermined number or more are present in either the first observation region 20A or the second observation region 20B. The predetermined number may be obtained by setting a value by which occurrence of a traffic jam can be discerned. The predetermined number may be appropriately changeable with an operation instruction or the like by the user.

For example, the determination unit 30C sequentially receives the detection result for the second observation region 20B (the second observation region 20BR and the second observation region 20BL) from each of the radar 14R and the radar 14L, respectively.

The determination unit 30C discerns whether the detection result received from the radar 14R is indicative of the presence of the target object 40. Similarly, the determination unit 30C discerns whether the detection result received from the radar 14L is indicative of the presence of the target object 40. Through the discerning processing, the determination unit 30C may make determination that the target objects 40 of a predetermined number or more are present in each of the second observation region 20BR of the radar 14R and the second observation region 20BL of the radar 14L.

Moreover, for example, the determination unit 30C analyzes the captured image of the imaging region 22 received from the imaging device 12, thereby discerning whether the number of target objects 40 imaged in the first observation region 20A, which is a partial region of the imaging region 22, is a predetermined number or more. Through the discerning processing, the determination unit 30C may make determination that a predetermined number of the target objects 40 or more are present in the first observation region 20A.

When having determined that the target object 40 of a predetermined number or more are present in the observation region 20, the determination unit 30C estimates that a traffic jam is occurring and makes determination that the target object 40 is present in the blind spot region 24.

In addition, in a case where the determination unit 30C has determined that the target objects 40 of the predetermined number or more are present in the observation region 20, the determination unit may further determine, similarly to the above, that the target object 40 is present in the blind spot region 24 adjacent to the observation region 20 among the blind spot regions 24.

Next, the following will describe the determination processing of determining whether at least part of the target object 40 imaged in the first observation region 20A being a display target region is located outside the first observation region 20A.

The determination unit 30C sequentially receives the captured images of the imaging region 22 from the imaging device 12. By analyzing the sequentially received captured images of the imaging region 22, the determination unit 30C specifies the target object 40 imaged in the first observation region 20A in the imaging region 22. Subsequently, regarding the captured images sequentially received from the imaging device 12, the determination unit 30C discerns whether at least part of the target object 40 imaged in the first observation region 20A in the imaging region 22 is located outside the first observation region 20A. Through the discerning processing, the determination unit 30C may determine whether at least part of the target object 40 imaged in the first observation region 20A being the display target region is located outside the first observation region 20A.

When having determined that at least part of the target object 40 imaged in the first observation region 20A is located outside the first observation region 20A, the determination unit 30C makes determination that the target object 40 is present in the blind spot region 24.

Moreover, when having determined that at least part of the target object 40 imaged in the first observation region 20A is located outside the first observation region 20A, the determination unit 30C may further determine in which blind spot region 24 the target object 40 is present among the blind spot regions 24 around the vehicle 1. For example, when having determined that at least part of the target object 40 imaged in the first observation region 20A is located outside the first observation region 20A, the determination unit 30C analyzes the captured image to specify the blind spot region 24 where a portion of the target object 40 located outside the first observation region 20A is present. Through the specifying processing, the determination unit 30C may further determine in which blind spot region 24 the target object 40 is present among the blind spot regions 24 around the vehicle 1.

In addition, the determination unit 30C may analyze the captured image to specify the type of the target object 40 discerned to be located outside the first observation region 20A. The type of the target object 40 includes, but is not limited to, a vehicle type, a human type, and an animal type. The type of vehicle includes but is not limited to, a motorcycle (motorcycle), a four-wheeled automobile, and a truck.

In this manner, the determination unit 30C makes determination that the target object 40 is present in the blind spot region 24 when at least one of conditions is satisfied. The conditions include: the target object 40 is present continuously for a predetermined period of time or more in at least one observation region 20 among the observation regions 20; the target objects 40 of a predetermined number or more are present in at least one observation region 20; and at least part of the target object 40 imaged in the first observation region 20A being a display target region is located outside the first observation region 20A.

In addition, the determination unit 30C may make determination that the target object 40 is present in the blind spot region 24 of the vehicle 1 by vehicle-to-vehicle communication with another vehicle. In this case, the determination unit 30C receives a message that is indicative of whether the target object 40 is present in the blind spot region 24 of the vehicle 1 from the other vehicle by vehicle-to-vehicle communication. The determination unit 30C may then analyze the message to determine whether the target object 40 is present in the blind spot region 24 of the vehicle 1. In addition, by analyzing the message, the determination unit 30C may further determine which blind spot region 24 around the vehicle 1 the target object 40 is present, the type or number of target objects 40 present in the blind spot region 24, and the like.

Description will be continued with reference to FIG. 2 again.

When having determined that the target object 40 is present in the blind spot region 24, the first output control unit 30D outputs first warning information that is indicative of the target object 40 is present in the blind spot region 24.

The present embodiment will describe an exemplary mode in which the first output control unit 30D outputs the first warning information to the display 18A which is an electronic mirror provided in the vehicle 1. Outputting the first warning information to the display 18A by the first output control unit 30D means controlling the display 18A to display the first warning information on the display 18A by the first output control unit 30D. The first output control unit 30D may further output the first warning information to a speaker included in the meter computer 18. Outputting the first warning information to the speaker by the first output control unit 30D means controlling the speaker to output a sound representing the first warning information from the speaker by the first output control unit 30D.

For example, the first output control unit 30D controls the display 18A to display the first observation region 20A being a display target region in the captured image sequentially received from the imaging device 12. Subsequently, the first output control unit 30D controls the display 18A to display the first warning information to be superimposed on the image of the first observation region 20A.

The first warning information may be information that is simply indicative of presence of a target object in the blind spot region 24.

For example, the first warning information represents a message for guiding the driver to visually recognize a vehicle accessory enabling the driver to confirm the target object present in the blind spot region 24.

In this case, the first output control unit 30D determines whether there is a vehicle accessory enabling the driver to visually recognize the blind spot region 24 in which the target object 40 determined by the determination unit 30C is present. For example, when there is a vehicle accessory enabling visual recognition of the blind spot region 24, the first output control unit 30D stores identification information of the blind spot region 24 and identification information of the vehicle accessory enabling visual recognition of the blind spot region 24 in association with each other. When the identification information of the vehicle accessory corresponding to the identification information of the blind spot region 24 including the target object 40 determined by the determination unit 30C is stored, the first output control unit 30D may output, as the first warning information, a message for guiding the driver to visually recognize the vehicle accessory identified by the identification information.

More specifically, it is assumed that the position of the target object 40 present in the blind spot region 24 is a position that can be confirmed by the driver with the right side mirror 18BR. In this case, the first output control unit 30D may generate and output, as the first warning information, a message for guiding the driver to visually recognize the right side mirror 18BR.

Additionally, as described above, the determination unit 30C may further determine at least one of the blind spot regions 24, in which the target object 40 is present. In this case, the first output control unit 30D may output the first warning information to a region on a display surface of the display 18A (e.g., an electronic mirror), the region being located on the side of the blind spot region 24 determined to include the target object 40. Specifically, for example, in a case where the target object 40 is determined to be present in the blind spot region 24R, the first output control unit 30D may output the first warning information to a region on the right side on the display surface of the display 18A. In contrast, in a case where the target object 40 is determined to be present in the blind spot region 24L, the first output control unit 30D may output the first warning information to the region on the left side on the display surface of the display 18A.

A period of time during which the first warning information is continuously output by the first output control unit 30D is not limited.

For example, the first output control unit 30D continuously outputs the first warning information for a predetermined period of time after the determination unit 30C makes determination that the target object is present in the blind spot region 24.

The predetermined period of time for continuously outputting the first warning information may be predefined.

This will be described with reference to FIG. 4.

For example, the first output control unit 30D may adjust the predetermined period of time so as to continuously output the first warning information even after the target object 40 present in the blind spot region 24 enters the observation region 20. The predetermined period of time may be a period of time from when the target object 40 is determined to be present in the blind spot region 24 to when a given period of time elapses from the entry of the target object 40 present in the blind spot region 24 into the observation region 20 after leaving the blind spot region 24.

In this case, the first output control unit 30D continuously outputs the first warning information for a predetermined period of time until a given period of time elapses after the target object 40 enters the blind spot region 24 (see arrows 60A, 60B, and 60C).

Alternatively, the predetermined period of time for continuously outputting the first warning information may be an estimation period of time required until at least part of the target object 40 goes outside the blind spot region 24 and enters the observation region 20 after the determination unit 30C makes determination that the target object 40 is present in the blind spot region 24.

In this case, the first output control unit 30D calculates a relative speed between the target object and the vehicle 1. The calculation of the relative speed may be performed by either the determination unit 30C or the first output control unit 30D. The present embodiment assumes that the determination unit 30C calculates the relative speed.

For example, the determination unit 30C sequentially receives the detection result of the second observation region 20B from the radar 14. Then, the determination unit 30C calculates the relative speed between the target object 40 and the vehicle 1 on the basis of the change in position of the detected object 40 in the second observation region 20B represented by the detection result. In addition, the determination unit 30C sequentially receives, from the imaging device 12, the captured images of the imaging region 22 including the first observation region 20A. The determination unit 30C then analyzes each of the captured images obtained in time series, and calculates the relative speed between the vehicle 1 and the target object 40 based on the size change or the like of the target object 40 included in the captured images. When the determination unit 30C makes determination that the target object 40 present in the observation region 20 is located outside the observation region 20, the latest relative speed calculated when the target object 40 is present in the observation region 20 may be used as the relative speed between the target object present in the blind spot region 24 and the vehicle 1.

Subsequently, the first output control unit 30D uses the relative speed between the vehicle 1 and the target object 40 calculated by the determination unit 30C and a maximum distance L (see FIG. 4) in the traveling direction of the vehicle 1 in the blind spot region 24 to calculate an estimation period of time required until the target object 40 goes outside the blind spot region 24 and enters the observation region 20.

The first output control unit 30D may pre-store the maximum distance L in the traveling direction of the vehicle 1 in the blind spot region 24 and use the maximum distance L for calculation of the estimation period of time. For example, it is assumed that the maximum distance L in the traveling direction of the vehicle 1 in the blind spot region 24 is 10.7 m. In addition, it is assumed that the relative speed between the vehicle 1 and the target object 40 present in the blind spot region 24 is 10 km/h. In this case, the first output control unit 30D calculates the estimation period of time of 3.9 seconds to be required until the target object 40 goes outside the blind spot region 24 and enters the observation region 20.

The first output control unit 30D may use the calculated estimation period of time as a predetermined period of time and may continuously output the first warning information for the predetermined period of time after the determination unit 30C makes determination that the target object is present in the blind spot region 24.

In this case, the first output control unit 30D continuously outputs the first warning information for a predetermined period of time from the entry of the target object 40 to the blind spot region 24 (see arrows 60A, 60B, and 60C) to the time of entry of the target object 40 to any of the observation regions 20 (see arrows 62A and 62B).

Alternatively, the predetermined period of time of continuously outputting the first warning information may be a period of time required until at least part of the target object 40 goes outside the blind spot region 24 and is detected from at least one of the observation regions 20 after the determination unit 30C makes determination that the target object 40 is present in the blind spot region 24.

In this case, the first output control unit 30D specifies the target object 40 determined to be present in the blind spot region 24 by the determination unit 30C.

For example, it is assumed that the determination unit 30C has discerned that at least part of the target object 40 imaged in the first observation region 20A is located outside the first observation region 20A, whereby the target object 40 is determined to be present in the blind spot region 24. Alternatively, it is assumed that the determination unit 30C has discerned that the target object 40 is continuously present in the first observation region 20A for a predetermined period of time or more or that the target objects 40 of a predetermined number or more are present in the first observation region 20A, whereby the target object 40 is determined to be present in the blind spot region 24.

In this case, the determination unit 30C analyzes the captured image to specify the target object imaged in the imaging region 22 including the first observation region 20A. The determination unit 30C specifies the type of the target object 40 and identification information such as a vehicle type and a vehicle number in a case where the target object 40 is a vehicle, thereby specifying the target object 40 present in the blind spot region 24. Subsequently, the determination unit 30C specifies the specified object 40 as a target object present in the blind spot region 24.

In addition, it is assumed that the determination unit 30C has discerned that the target object 40 is continuously present in the second observation region 20B for a predetermined period of time or more or that the target objects of a predetermined number or more are present in the second observation region 20B, whereby the target object 40 has been determined to be present in the blind spot region 24.

In this case, the determination unit 30C may specify the target object 40 present in the blind spot region 24 using the relative speed of the target object 40 calculated in the manner similar to the above, vehicle-to-vehicle communication, or the like.

Subsequently, the first output control unit 30D calculates a period of time from the time when the determination unit 30C has determined that the target object 40 is present in the blind spot region 24 until at least part of the target object 40 goes outside the blind spot region 24 and is detected from at least one of the observation regions 20.

For example, the first output control unit 30D may calculate a period of time from when the determination unit 30C makes determination that the target object 40 is present in the blind spot region 24 until a timing at which the specified object 40 present in the blind spot region 24 is detected from the second observation region 20B or the first observation region 20A.

The first output control unit 30D may analyze the captured image of the imaging region 22 including the first observation region 20A to specify the timing at which the target object 40 specified to be present in the blind spot region 24 is detected from the first observation region 20A. Alternatively, the first output control unit 30D may calculate the relative speed of the target object similarly to the above, and may use the calculated relative speed to calculate the timing at which the target object 40 specified to be present in the blind spot region 24 is detected from the second observation region 20B. Alternatively, the first output control unit 30D may use vehicle-to-vehicle communication with another vehicle to specify the timing at which the specified target object 40 present in the blind spot region 24 is detected from the second observation region 20B or the first observation region 20A.

The first output control unit 30D may continuously output the first warning information for a predetermined period of time, which is a period of time from the time when the determination unit 30C has determined that the target object 40 is present in the blind spot region 24 until the timing at which the target object 40 is detected from the second observation region 20B or the first observation region 20A.

In this case, the first output control unit 30D continuously outputs the first warning information for a predetermined period of time from the entry of the target object 40 to the blind spot region 24 (see arrows 60A, 60B, and 60C) until the target object 40 is detected from any observation region 20 (see arrows 62A and 62B).

In addition, the first output control unit 30D may start the output of the first warning information when the determination unit 30C makes determination that the target object is present in the blind spot region 24, and may stop the output of the first warning information in a case where at least part of the target object is not detected from any of the observation regions 20 for a predetermined period of time after the determination that the target object is present in the blind spot region 24.

In this case, the first output control unit 30D continuously outputs the first warning information for a predetermined period of time in which at least part of the target object 40 is not continuously detected from any of the observation regions 20 after the target object 40 enters the blind spot region 24 (see arrows 60A, 60B, and 60C). After a lapse of the predetermined period of time in which at least part of the target object 40 is not continuously detected from any of the observation regions 20, the first output control unit 30D stops outputting the first warning information.

Note that at least one of the determination unit 30C and the first output control unit 30D may detect a target object in at least either one of the observation region 20 or the blind spot region 24 by vehicle-to-vehicle communication with another vehicle.

In this case, by detecting and specifying the target object 40 by vehicle-to-vehicle communication, the determination unit 30C and the first output control unit 30D can continuously output the first warning information for a predetermined period of time which is a period of time from the entry of the target object 40 to the blind spot region 24 (see arrows 60A, 60B, and 60C) until the target object 40 goes outside the blind spot region 24 (arrows 62A, 62B, and 62C).

The determination unit 30C and the first output control unit 30D may start the above processing when the ignition switch of the vehicle 1 is operated and power is supplied to each part of the vehicle 1.

In addition, the determination unit 30C and the first output control unit 30D may start the above processing when the moving speed of the vehicle 1 is a predetermined speed or more, or when the moving speed of the vehicle 1 is below the predetermined speed and a direction indicator for notifying the surroundings of a change in the moving direction of the vehicle 1 is operated.

For example, the determination unit 30C determines whether the moving speed, which is the speed of the vehicle 1 received from the traveling control unit 16 via the CAN, is a predetermined speed or more. For example, the predetermined speed may be determined by setting an effective host vehicle speed of the detection function of the first observation region 20A and the second observation region 20B. In one example, the predetermined speed is 30 km/h, but is not limited to this. When having determined that the moving speed, which is the speed of the vehicle 1, is the predetermined speed or more, the determination unit 30C may execute the above-described determination processing of determining whether the target object 40 is present in the blind spot region 24.

In addition, in a case where the moving speed being the speed of the vehicle 1 is below the predetermined speed, the determination unit 30C may execute the above-described determination processing of determining whether the target object 40 is present in the blind spot region 24 when the direction indicator is operated. The determination unit 30C may determine whether the direction indicator has been operated by analyzing the operation information of the direction indicator received from the traveling control unit 16.

Next, the information processing device 10 according to the present embodiment will be described with a specific example.

Figure 5A:
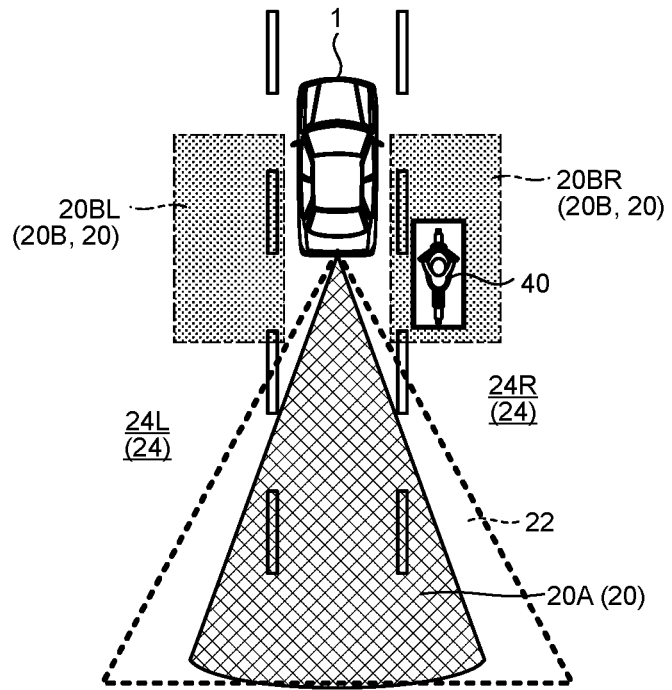
FIG. 5A is an explanatory diagram of an example of information processing in a case where a target object is present in a second observation region.
Figure 5B:
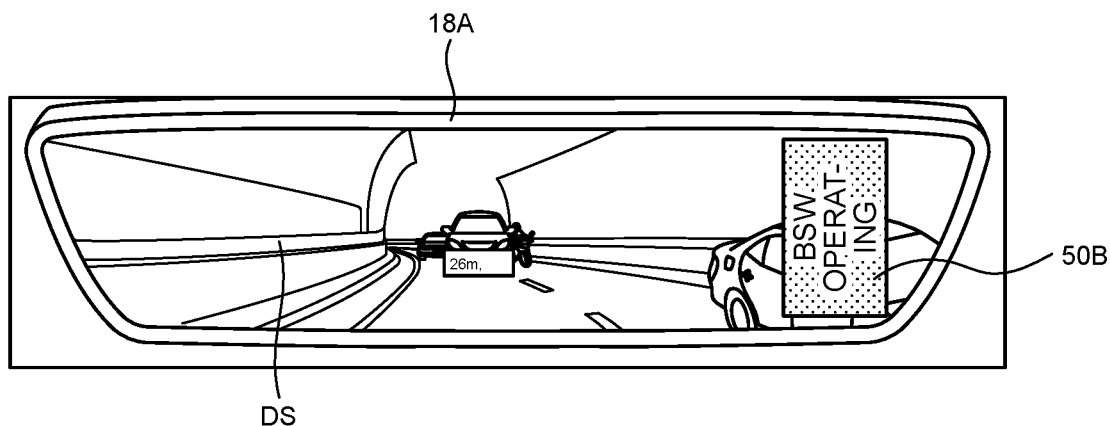
FIG. 5B is an explanatory diagram of an example of information processing in a case where a target object is present in the second observation region.
Figure 5C:
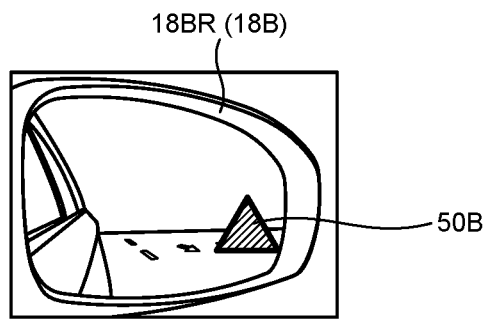
FIG. 5C is an explanatory diagram of an example of information processing in a case where a target object is present in the second observation region.

FIGS. 5A to 5C are explanatory diagrams of an example of information processing in a case where the target object 40 is present in the second observation region 20B.

As illustrated in FIG. 5A, when the target object 40 is present in the second observation region 20BR of the radar 14R, the second output control unit 30A outputs second warning information that is indicative of presence of the target object 40 in the second observation region 20BR. Specifically, the second output control unit 30A outputs second warning information 50B to the indicator of the right side mirror 18BR (see FIG. 5C).

The second output control unit 30A outputs, to the first output control unit 30D, second warning information output ongoing information that represents that the output of the second warning information is ongoing.

Having received the second warning information output ongoing information, the first output control unit 30D outputs, to a display surface DS of the display 18A, second warning information 50B representing that the second output control unit 30A is operating (see FIG. 5B). For example, the first output control unit 30D controls to display the second warning information 50B in a region on the display surface DS located on the side where the target object 40 is present.

The position of displaying the second warning information 50B may be any position on the display surface DS, and is not limited to the example illustrated in FIG. 5B. That is, the position of displaying the second warning information 50B may be any position, and the position of displaying the second warning information 50B is not limited to the region on the display surface DS located on the side where the target object 40 is present. For example, the first output control unit 30D may display the second warning information 50B on any position of the display surface DS, such as the upper end side or the lower end side.

Figure 6A:
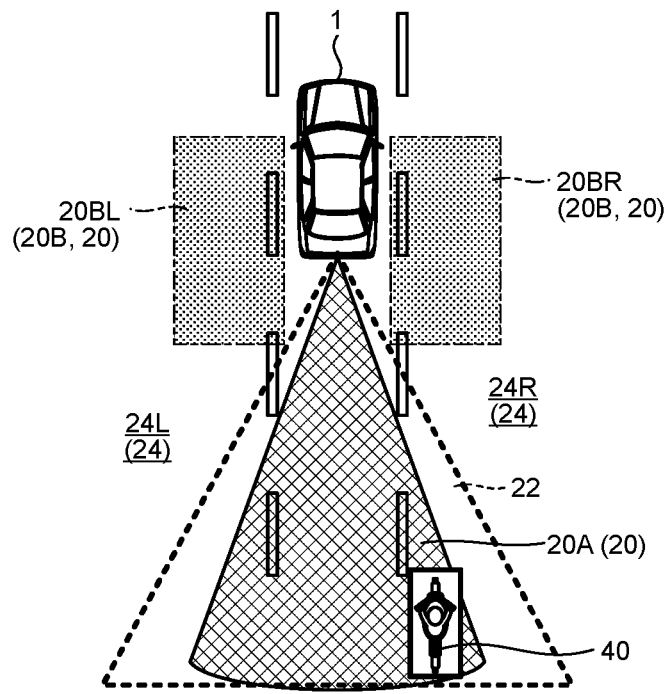
FIG. 6A is an explanatory diagram of an example of information processing in a case where a target object is present in a first observation region.
Figure 6B:
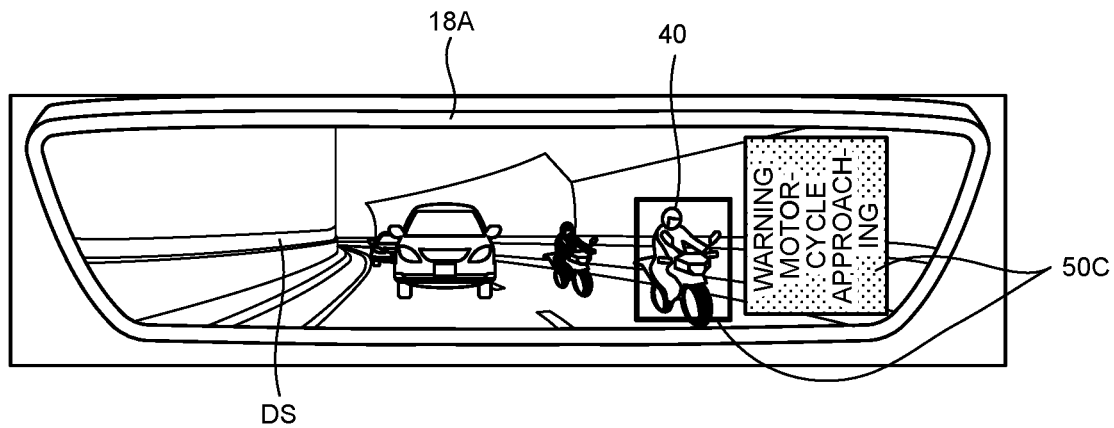
FIG. 6B is an explanatory diagram of an example of information processing in a case where a target object is present in the first observation region.
Figure 6C:
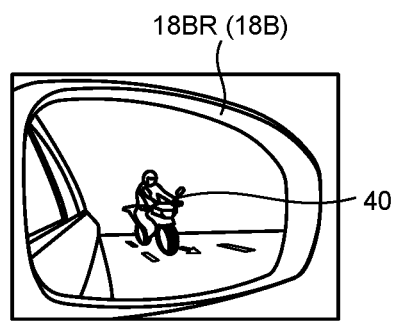
FIG. 6C is an explanatory diagram of an example of information processing in a case where a target object is present in the first observation region.

FIGS. 6A to 6C are explanatory diagrams of an example of information processing in a case where the target object 40 is present in the first observation region 20A.

As illustrated in FIG. 6A, when the target object 40 is present in the first observation region 20A, the first output control unit 30D outputs, to the display surface DS of the display 18A, third warning information 50C that is indicative of presence of the target object 40 in the first observation region 20A (see FIG. 6B). For example, as the third warning information 50C, the first output control unit 30D outputs a box frame surrounding the region of the target object 40 in the display 18A to the display surface DS. In addition, it is assumed that the determination unit 30C specifies the type of the target object 40 as "motorcycle". In this case, the first output control unit 30D may output, to the display surface DS of the display 18A, third warning information 50C representing that the motorcycle as the target object 40 is approaching.

At this time, the first output control unit 30D may adjust the position at which the third warning information 50C is to be displayed on the display surface DS of the display 18A in accordance with the position of the target object 40 present in the first observation region 20A. For example, it is assumed that the target object 40 is present in a region on the right side of the center in a vehicle width direction of the vehicle 1 in the first observation region 20A. The determination unit 30C may analyze the captured image to make determination that the target object 40 is present in a region on the right side of the center in the vehicle width direction of the vehicle 1 in the first observation region 20A. In this case, the first output control unit 30D controls to display the third warning information 50C in a right side region on the display surface DS of the display 18A.

The position of displaying the third warning information 50C may be any position on the display surface DS, and is not limited to the example illustrated in FIG. 6B. That is, the position of displaying the third warning information 50C may be any position, and the position of displaying the third warning information 50C is not limited to the region on the display surface DS located on the side where the target object 40 is present. For example, in the case of the situation in FIG. 6A, the first output control unit 30D may display the third warning information 50C on any position of the display surface DS, such as the upper end side or the lower end side.

In the example illustrated in FIG. 6A, the target object 40 is not included in the second observation region 20B, and thus, the second warning information 50B is not to be output to the side mirror 18B (see FIG. 6C). For example, when the target object 40 appears on the right side mirror 18BR, the driver can visually recognize the target object 40 by visually recognizing the right side mirror 18BR.

Figure 7A:
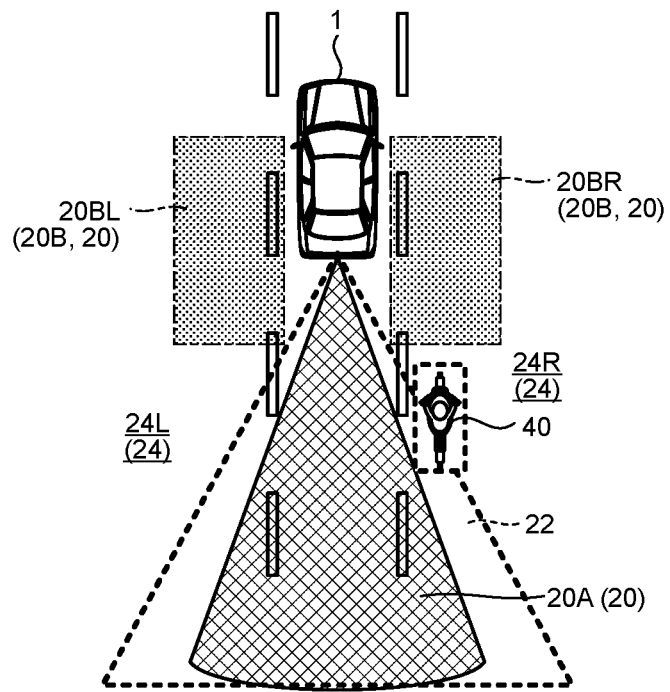
FIG. 7A is an explanatory diagram of an example of information processing in a case where a target object is present in a blind spot region.
Figure 7B:
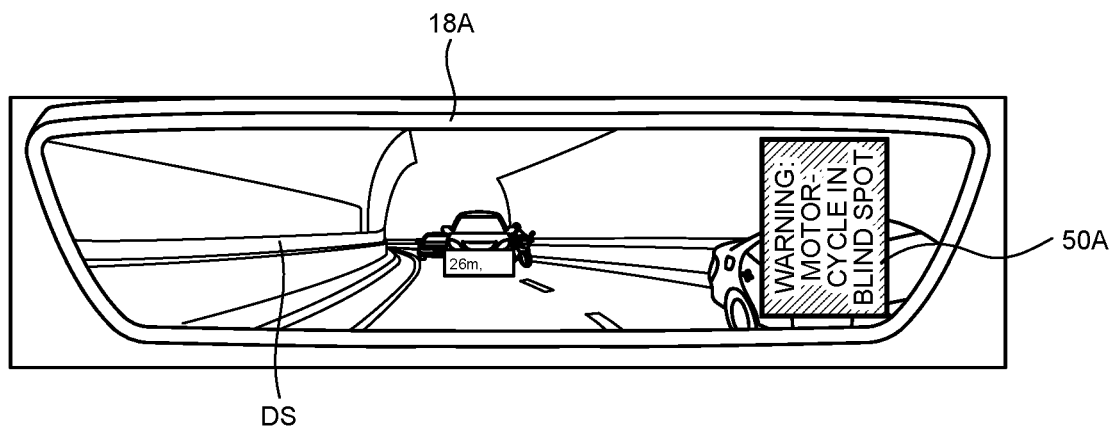
FIG. 7B is an explanatory diagram of an example of information processing in a case where a target object is present in a blind spot region.
Figure 7C:
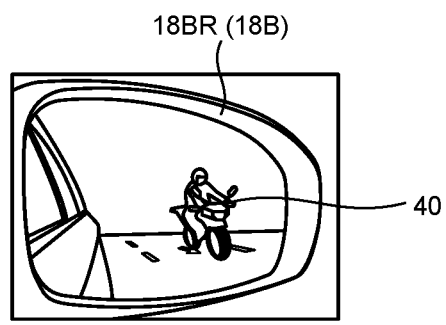
FIG. 7C is an explanatory diagram of an example of information processing in a case where a target object is present in a blind spot region.

FIGS. 7A to 7C are explanatory diagrams of an example of information processing in a case where the target object 40 is present in the blind spot region 24.

As illustrated in FIG. 7A, it is assumed that part of the target object 40 is present in the imaging region 22 in the blind spot region 24. In this case, the determination unit 30C makes determination that the target object 40 is present in the blind spot region 24. As described above, the determination unit 30C determines whether at least one condition described above is satisfied, thereby determining that the target object 40 is present in the blind spot region 24. By executing the determination processing described above by the determination unit 30C, it can be determined that the target object 40 is present in the blind spot region 24 in a case where part of the target object 40 is present in the imaging region 22 in the blind spot region 24 as illustrated in FIG. 7A. Moreover, as described above, the determination unit 30C may further determine in which blind spot region 24 the target object 40 is present among the blind spot regions 24.

The first output control unit 30D outputs, to the display 18A, first warning information 50A that is indicative of presence of the target object 40 in the blind spot region 24 (see FIG. 7B). Specifically, the first output control unit 30D outputs the first warning information 50A to a region on the display surface DS of the display 18A located on the blind spot region 24 side in which the target object 40 has been determined to be present.

The position of displaying the first warning information 50A may be any position on the display surface DS, and is not limited to the example illustrated in FIG. 7B. That is, the position of displaying the first warning information 50A may be any position, and the position of displaying the first warning information 50A is not limited to the blind spot region 24 side region on the display surface DS, in which the target object 40 has been determined to be present. For example, in the case of the situation in FIG. 7A, the first output control unit 30D may display the first warning information 50A on any position of the display surface DS, such as the upper end side or the lower end side.

In addition, it is assumed that the determination unit 30C specifies the type of the target object 40 as "motorcycle". In this case, the first output control unit 30D may output, to the display surface DS of the display 18A, the first warning information 50A that is indicative of presence of the motorcycle as the target object 40 in the blind spot region 24. In addition, the first output control unit 30D may output, to the display 18A, the first warning information 50A in a specific color capable of attracting attention of the user. The specific color is, but is not limited to, red, yellow, etc.

The first output control unit 30D may further output an audio representing the first warning information 50A from a speaker included in the meter computer 18.

In the example illustrated in FIG. 7A, the target object 40 is not included in the second observation region 20B, and thus, the second warning information 50B is not output to the side mirror 18B (see FIG. 7C). For example, when the target object 40 appears in the right side mirror 18BR, the driver can visually recognize the target object 40 by visually recognizing the right side mirror 18BR present on the display surface DS located on the side of a region where the first warning information 50A is displayed.

Figure 8A:
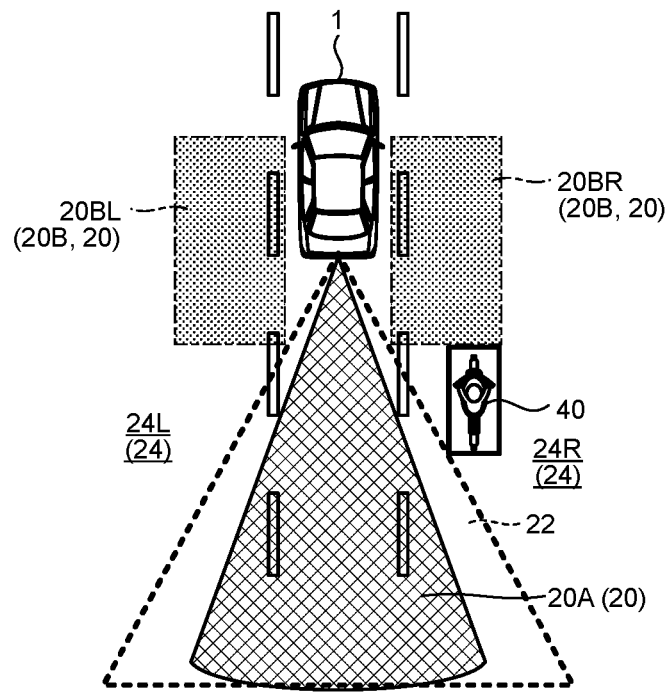
FIG. 8A is an explanatory diagram of an example of information processing in a case where a target object is present in a blind spot region.
Figure 8B:
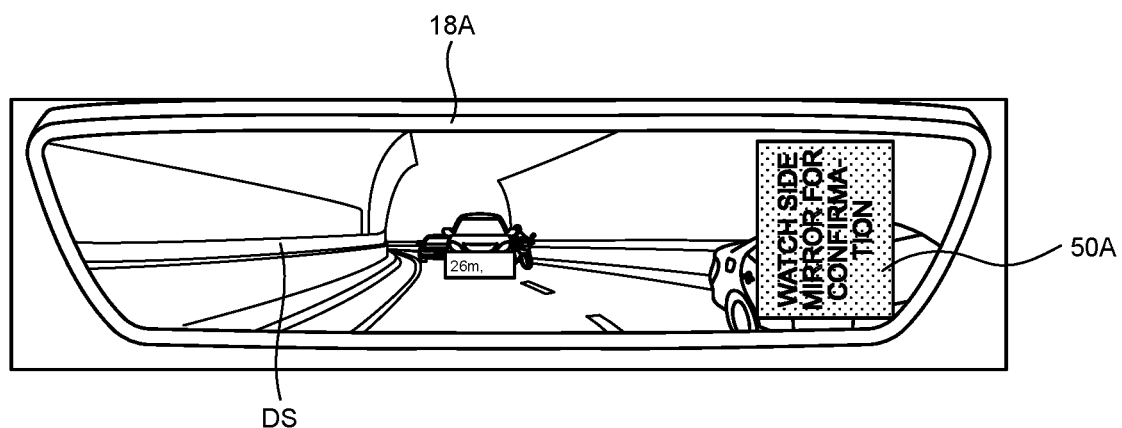
FIG. 8B is an explanatory diagram of an example of information processing in a case where a target object is present in a blind spot region.
Figure 8C:
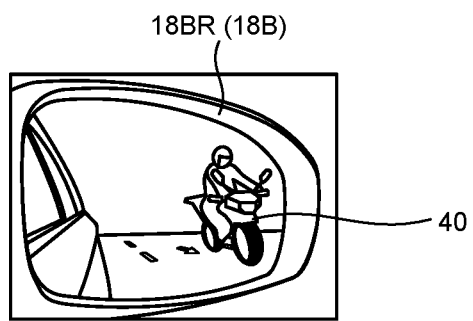
FIG. 8C is an explanatory diagram of an example of information processing in a case where a target object is present in a blind spot region.

FIGS. 8A to 8C are explanatory diagrams of an example of information processing in a case where the target object 40 is present in the blind spot region 24.

As illustrated in FIG. 8A, it is assumed that the target object 40 is present in the blind spot region 24. In this case, the determination unit 30C makes determination that the target object 40 is present in the blind spot region 24. As described above, the determination unit 30C determines whether at least one condition described above is satisfied, thereby determining that the target object 40 is present in the blind spot region 24. By executing the determination processing described above by the determination unit 30C, it can be determined that the target object 40 is present in the blind spot region 24 in a case where the target object 40 is present within the blind spot region 24 and outside the imaging region 22 as illustrated in FIG. 8A. Moreover, as described above, the determination unit 30C may further determine in which blind spot region 24 the target object 40 is present among the blind spot regions 24.

The first output control unit 30D outputs, to the display 18A, first warning information 50A that is indicative of presence of the target object 40 in the blind spot region 24 (see FIG. 8B). Specifically, the first output control unit 30D outputs the first warning information 50A to a region on the display surface DS of the display 18A located on the blind spot region 24 side in which the target object 40 has been determined to be present.

The position of displaying the first warning information 50A may be any position on the display surface DS, and is not limited to the example illustrated in FIG. 8B. That is, the position of displaying the first warning information 50A may be any position, and the position of displaying the first warning information 50A is not limited to the blind spot region 24 side region on the display surface DS, in which the target object 40 has been determined to be present. For example, in the case of the situation in FIG. 8A, the first output control unit 30D may display the first warning information 50A on any position of the display surface DS, such as the upper end side or the lower end side.

In addition, the first output control unit 30D may output, as the first warning information 50A, a message for guiding the driver to visually recognize the vehicle accessory enabling the driver to confirm the target object 40 present in the blind spot region 24. FIG. 8B illustrates an exemplary scene in which a message for guiding the driver to visually recognize the side mirror 18B, which is a vehicle accessory enabling the drive to confirm the target object 40, is output as the first warning information 50A. In addition, the first output control unit 30D may output, to the display 18A, the first warning information 50A in a specific color capable of attracting attention of the user. In addition, the first output control unit 30D may control the first warning information 50A to blink to be output to the display 18A.

The first output control unit 30D may further output an audio representing the first warning information 50A from a speaker included in the meter computer 18.

In the example illustrated in FIG. 7A, the target object 40 is not included in the second observation region 20B, and thus, the second warning information 50B is not output to the side mirror 18B (see FIG. 7C). For example, when the target object 40 appears in the right side mirror 18BR, the driver can visually recognize the target object 40 by visually recognizing the right side mirror 18BR present on the display surface DS located on the side of a region where the first warning information 50A is displayed.

Next, an example of a procedure of information processing executed by the information processing device 10 according to the present embodiment will be described.

FIG. 9 is a flowchart illustrating an example of a procedure of information processing executed by the information processing device 10 according to the present embodiment.

Note that it is assumed that, when the target object is present in the second observation region 20B, the second output control unit 30A is separately executing processing of outputting second warning information that is indicative of presence of the target object in the second observation region 20B.

The reception unit 30B receives a captured image including the first observation region 20A (Step S100). The determination unit 30C starts tracking the target object 40 (Step S102). The determination unit 30C starts tracking the target object 40 included in the observation region 20 by using the captured image received in Step S100, the measurement result of the second observation region 20B of the radar 14 obtained by the second output control unit 30A, the message received by the vehicle-to-vehicle communication, and the like.

Next, the determination unit 30C calculates the relative speed between the vehicle 1 and the target object 40 tracking of which has been started in Step S102 (Step S104).

Next, the determination unit 30C determines whether the target object 40 is present in the blind spot region 24 (Step S106). As described above, the determination unit 30C determines whether the target object is present in the blind spot region 24 by discerning whether at least one of conditions is satisfied. The conditions includes: the target object 40 is present continuously for a predetermined period of time or more in at least one observation region 20 among the observation regions 20; the target objects of a predetermined number or more are present in at least one observation region 20; or at least part of the target object imaged in the first observation region 20A being a display target region is located outside the first observation region 20A.

In response to determining that the target object 40 is not present in the blind spot region 24 (Step S106: No), the processing returns to Step S100 described above. In response to determining that the target object 40 is present in the blind spot region 24 (Step S106: Yes), the processing proceeds to Step S108.

In Step S108, the first output control unit 30D starts outputting the first warning information 50A that is indicative of presence of the target object 40 in the blind spot region 24 (Step S108).

The first output control unit 30D determines whether a predetermined period of time has elapsed since the start of output of the first warning information 50A in Step S108 (Step S110).

As described above, examples of the predetermined period of time include: a predefined period of time after the target object 40 is determined to be present in the blind spot region 24; a period of time until the target object 40 present in the blind spot region 24 goes outside the blind spot region 24 and enters the observation region 20 and a certain period of time further elapses thereafter; an estimation period of time required until at least part of the target object 40 present in the blind spot region 24 goes outside the blind spot region 24 and enters the observation region 20; a period of time until at least part of the target object 40 present in the blind spot region 24 goes outside the blind spot region 24 and is detected from at least one of the observation regions 20; and a predetermined period of time during which at least part of the target object 40 present in the blind spot region 24 is not continuously detected from any of the observation regions 20.

The first output control unit 30D repeats the negative determination (Step S110: No) until it is determined that the predetermined period of time has elapsed. When having determined that the predetermined period of time has elapsed (Step S110: Yes), the first output control unit 30D proceeds to Step S112. The first output control unit 30D stops the output of the first warning information 50A that has started to be output in Step S108 (Step S112). This steps completes the routine.

The information processing device 10 in the present embodiment may start the information processing illustrated in FIG. 9 when the ignition switch of the vehicle 1 is operated and power is supplied to each part of the vehicle 1. In addition, the information processing device 10 may start the above information processing illustrated in FIG. 9 when the moving speed of the vehicle 1 is a predetermined speed or more, or when the moving speed of the vehicle 1 is below the predetermined speed and a direction indicator for notifying the surroundings of a change in the moving direction of the vehicle 1 is operated. The information processing device 10 in the present embodiment may repeatedly execute the information processing illustrated in FIG. 9 continuously until the power supply to each part of the vehicle 1 is turned off. The information processing device 10 according to the present embodiment may end the repetition of the information processing illustrated in FIG. 9 when the moving speed of the vehicle 1 is below the predetermined speed, or when the moving speed of the vehicle 1 is the predetermined speed or more and the operation time of the direction indicator for notifying the surroundings of the change in the moving direction of the vehicle 1 has elapsed.

As described above, the information processing device 10 according to the present embodiment includes the determination unit 30C and the first output control unit 30D. The determination unit 30C determines whether the target object 40 is present in the blind spot region 24 between non-overlapping observation regions 20 around the mobility (vehicle 1). When having determined that the target object 40 is present in the blind spot region 24, the first output control unit 30D outputs first warning information 50A that is indicative of presence of the target object 40 in the blind spot region 24.

In this manner, when having determined that the target object 40 is present in the blind spot region 24, the information processing device 10 according to the present embodiment outputs the first warning information 50A that is indicative of presence of the target object 40 in the blind spot region 24.

Accordingly, the information processing device 10 of the present embodiment can warn that the target object 40 is present in the blind spot region 24.

The present embodiment has been described with example of a mode in which the information processing device 10 is installed on the vehicle 1. However, the information processing device 10 may be installed outside the vehicle 1. The information processing device 10 just needs to be communicably connected to various electronic devices such as the imaging device 12, the radar 14, the G sensor 15, the traveling control unit 16, and the meter computer 18 provided in the vehicle 1. Therefore, the information processing device 10 may be installed on an information processing device provided outside the vehicle 1. In this case, the information processing device on which the information processing device 10 is installed and the various electronic devices may be configured to be communicable via a network or the like.

Note that the present disclosure can also take the following configurations.

Configuration 1

An information processing device comprising:
a memory in which a computer program is stored; and
a hardware processor coupled to the memory and configured to perform processing by executing the computer program, the processing including:
  determining whether a target object is present in a blind spot region between non-overlapping observation regions around a mobility; and
  outputting first warning information indicative of presence of the target object in the blind spot region in a case where the target object has been determined to be present in the blind spot region.

Configuration 2

The information processing device according to Configuration 1, wherein, in the processing, the hardware processor makes determination that the target object is present in the blind spot region when at least one of conditions is satisfied, the conditions including:
   a target object is present continuously for a predetermined time or more in at least one of the observation regions; and
   target objects of a predetermined number or more are present in at least one of the observation regions.

Configuration 3

The information processing device according to Configuration 1 or 2, wherein
   the processing further includes receiving a captured image in which a first observation region being a display target region around the mobility is included, and,
   in the processing, the hardware processor
      outputs the first observation region in the captured image to a display, and
      makes determination that the target object is present in the blind spot region when at least part of the target object imaged in the first observation region is located outside the first observation region.

Configuration 4

The information processing device according to Configuration 3, wherein
   the processing further includes outputting second warning information indicative of presence of a target object in a second observation region around the mobility when the target object is present in the second observation region, the second observation region being a region non-overlapping with the first observation region, and,
   in the processing, the hardware processor determines whether a target object is present in the blind spot region between the first observation region and the second observation region.

Configuration 5

The information processing device according to any one of Configurations 1 to 4, wherein, in the processing, the hardware processor performs the determination on whether the target object is present in the blind spot region when one of conditions is satisfied, the conditions including:
   a moving speed of the mobility becomes a predetermined speed or more; and
   a moving speed of the mobility becomes below the predetermined speed and a direction indicator for notifying surroundings of a change in a moving direction of the mobility is operated.

Configuration 6

The information processing device according to any one of Configurations 1 to 5, wherein, in the processing, the hardware processor continuously performs the output of the first warning information for a predetermined period of time after the target object is determined to be present in the blind spot region.

Configuration 7

The information processing device according to Configuration 6, wherein the predetermined period of time is an estimation period of time from when the target object is determined to be present in the blind spot region to when at least part of the target object enters the observation region.

Configuration 8

The information processing device according to Configuration 6 or 7, the predetermined period of time is a period of time from when the target object is determined to be present in the blind spot region to when at least part of the target object goes outside the blind spot region and is detected from at least one of the observation regions.

Configuration 9

The information processing device according to any one of Configurations 1 to 8, wherein, in the processing, the hardware processor
   starts outputting the first warning information when the target object is determined to be present in the blind spot region, and
   stops the outputting of the first warning information when at least part of the target object has not been detected from any of the observation regions for a predetermined period of time after the target object is determined to be present in the blind spot region.

Configuration 10

The information processing device according to any one of Configurations 1 to 9, wherein the first warning information is indicative of a message for guiding a driver to visually recognize a vehicle accessory enabling the driver to confirm the target object present in the blind spot region.

Configuration 11

The information processing device according to any one of Configurations 1 to 10, wherein, in the processing, the hardware processor
   further determines one of the blind spot regions around the mobility, in which the target object is present, and
   outputs the first warning information onto a region on a display surface of a display device provided in the mobility, the region being located on a side of the one of the blind spot regions where the target object has been determined to be present.

Configuration 12

The information processing device according to any one of Configurations 1 to 11, wherein
   the mobility and the target object are vehicles, and,
   in the processing, the hardware processor detects the target object from at least one of the observation region and the blind spot region by vehicle-to-vehicle communication with another vehicle.

Configuration 13

An information processing method implemented by a computer, the method comprising:
   determining whether a target object is present in a blind spot region between observation regions around a mobility; and
   outputting first warning information indicative of presence of the target object in the blind spot region in a case where the target object has been determined to be present in the blind spot region.

Configuration 14

A non-transitory computer-readable recording medium on which programmed instructions are recorded, the instructions causing a computer to execute processing, the processing comprising:
  determining whether a target object is present in a blind spot region between observation regions around a mobility; and
  outputting first warning information indicative of presence of the target object in the blind spot region in a case where the target object has been determined to be present in the blind spot region.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing device, comprising:
  a memory in which a computer program is stored; and
  a hardware processor coupled to the memory and configured to perform processing by executing the computer program, the processing including:
    determining whether a target object is present in a blind spot region between observation regions around a mobility; and
    outputting first warning information indicative of a presence of the target object in the blind spot region in a case where the target object is determined to be present in the blind spot region, wherein
  the observation regions include a first observation region and a second observation region, the second observation region not overlapping with the first observation region,
  the blind spot region is located at least partially between the first observation region and the second observation region and does not overlap with the first observation region and the second observation region,
  the processing further includes:
    receiving a captured image in which the first observation region is included; and
    receiving a detection result for the second observation region from a sensor observing the second observation region, and
  the determining of whether the target object is present in the blind spot region is based on at least one of the captured image and the detection result.

2. The information processing device according to claim 1, wherein, in the processing, the hardware processor determines that the target object is present in the blind spot region when at least one of conditions is satisfied, the conditions including:
  the target object being present continuously for a predetermined time or more in at least one of the observation regions; and
  target objects of a predetermined number or more being present in at least one of the observation regions.

3. The information processing device according to claim 1, wherein
  in the processing, the hardware processor
    outputs the first observation region in the captured image to a display, and
    determines that the target object is present in the blind spot region when at least part of the target object imaged in the first observation region is located outside the first observation region.

4. The information processing device according to claim 3, wherein
  the processing further includes outputting second warning information indicative of the presence of the target object in the second observation region around the mobility when the target object is present in the second observation region.

5. The information processing device according to claim 1, wherein, in the processing, the hardware processor determines whether the target object is present in the blind spot region when one of conditions is satisfied, the conditions including:
  a moving speed of the mobility being a predetermined speed or more; and
  a moving speed of the mobility being below the predetermined speed and a direction indicator for notifying surroundings of a change in a moving direction of the mobility being operated.

6. The information processing device according to claim 1, wherein, in the processing, the hardware processor continuously outputs the first warning information for a predetermined period of time after the target object is determined to be present in the blind spot region.

7. The information processing device according to claim 6, wherein the predetermined period of time is an estimation period of time from when the target object is determined to be present in the blind spot region to when at least part of the target object enters one of the observation regions.

8. The information processing device according to claim 6, wherein the predetermined period of time is from when the target object is determined to be present in the blind spot region to when at least part of the target object goes outside the blind spot region and is detected from at least one of the observation regions.

9. The information processing device according to claim 1, wherein, in the processing, the hardware processor
  starts outputting the first warning information when the target object is determined to be present in the blind spot region, and
  stops the outputting of the first warning information when at least part of the target object has not been detected from any of the observation regions for a predetermined period of time after the target object is determined to be present in the blind spot region.

10. The information processing device according to claim 1, wherein the first warning information is indicative of a message for guiding a driver to visually recognize a vehicle accessory enabling the driver to confirm the target object is present in the blind spot region.

11. The information processing device according to claim 1, wherein, in the processing, the hardware processor
  further determines one of plural blind spot regions around the mobility, in which the target object is present, and
  outputs the first warning information onto a region on a display surface of a display device provided in the mobility, the region being located on a side of the one of the plural blind spot regions where the target object is present.

12. The information processing device according to claim 1, wherein
the mobility and the target object are vehicles, and
in the processing, the hardware processor detects the target object from at least one of the observation regions and the blind spot region by vehicle-to-vehicle communication with another vehicle.

13. An information processing method implemented by a computer, the information processing method comprising:
determining whether a target object is present in a blind spot region between observation regions around a mobility; and
outputting first warning information indicative of a presence of the target object in the blind spot region in a case where the target object is determined to be present in the blind spot region, wherein
the observation regions include a first observation region and a second observation region, the second observation region not overlapping with the first observation region,
the blind spot region is located at least partially between the first observation region and the second observation region and does not overlap with the first observation region and the second observation region,
the information processing method further comprises:
receiving a captured image in which the first observation region is included; and
receiving a detection result for the second observation region from a sensor observing the second observation region, and
the determining of whether the target object is present in the blind spot region is based on at least one of the captured image and the detection result.

14. A non-transitory computer-readable recording medium on which programmed instructions are recorded, the programmed instructions causing a computer to execute processing, the processing comprising:
determining whether a target object is present in a blind spot region between observation regions around a mobility; and
outputting first warning information indicative of a presence of the target object in the blind spot region in a case where the target object is determined to be present in the blind spot region, wherein
the observation regions include a first observation region and a second observation region, the second observation region not overlapping with the first observation region,
the blind spot region is located at least partially between the first observation region and the second observation region and does not overlap with the first observation region and the second observation region,
the processing further comprises:
receiving a captured image in which the first observation region is included; and
receiving a detection result for the second observation region from a sensor observing the second observation region, and
the determining of whether the target object is present in the blind spot region is based on at least one of the captured image and the detection result.

* * * * *